US012012051B2

(12) United States Patent
Miller

(10) Patent No.: US 12,012,051 B2
(45) Date of Patent: Jun. 18, 2024

(54) WINDOW-ATTACHABLE ANIMAL HEAD DEVICE

(71) Applicant: Jerry Miller, Branson, MO (US)

(72) Inventor: Jerry Miller, Branson, MO (US)

( * ) Notice: Subject to any disclaimer, the term of this patent is extended or adjusted under 35 U.S.C. 154(b) by 289 days.

(21) Appl. No.: 17/533,675

(22) Filed: Nov. 23, 2021

(65) Prior Publication Data

US 2023/0104266 A1    Apr. 6, 2023

Related U.S. Application Data

(60) Provisional application No. 63/247,832, filed on Sep. 24, 2021.

(51) Int. Cl.
*B60R 13/04* (2006.01)
*B60R 11/00* (2006.01)

(52) U.S. Cl.
CPC .............. *B60R 13/04* (2013.01); *B60R 11/00* (2013.01); *B60R 2011/004* (2013.01); *B60R 2011/0056* (2013.01)

(58) Field of Classification Search
None
See application file for complete search history.

(56) References Cited

U.S. PATENT DOCUMENTS

| 4,421,288 | A | * | 12/1983 | Blaszkowski | ........... F16B 47/00 248/363 |
| 2002/0162258 | A1 | * | 11/2002 | Anderson | ............... G09F 21/04 428/31 |
| 2003/0192217 | A1 | * | 10/2003 | Anderson | ............... G09F 21/04 40/591 |
| 2018/0209582 | A1 | * | 7/2018 | Petts | .................... F16M 13/022 |

FOREIGN PATENT DOCUMENTS

GB      2490357 A  * 10/2012  ............. G09F 19/08

OTHER PUBLICATIONS

Gotthardt, Alexxa; How Googly Eyes Became an Essential Part of Crafts (accessed on Nov. 2, 2023 at https://www.artsy.net/article/artsy-editorial-googly-eyes-essential-crafts) (Year: 2018).*

* cited by examiner

*Primary Examiner* — Elizabeth Collister
(74) *Attorney, Agent, or Firm* — Brennan, Manna & Diamond, LLC

(57) ABSTRACT

The present invention relates to a window-attachment animal head device, primarily comprised of a body that resembles the head of an animal and that comprises at least one suction cup and at least one L-bracket that allows the device to removably-attach to a vehicle window. The body is also comprised of a set of ears, a set of eyes, a nose/snout, and a mouth with a tongue. Both the tongue and the ears may be of an exaggerated length and are non-rigid, such that they can be blown freely by the wind while the device is attached to a vehicle window and the vehicle is in motion. In this manner, the device allows a user to bring joy, humor and happiness to passing motorists which would ordinarily occur by bringing the pet in a vehicle, but without having to bring said pet into the vehicle.

16 Claims, 4 Drawing Sheets

WINDOW-ATTACHABLE ANIMAL HEAD DEVICE

CROSS-REFERENCE TO RELATED APPLICATION

The present application claims priority to, and the benefit of, U.S. Provisional Application No. 63/247,832, which was filed on Sep. 24, 2021 and is incorporated herein by reference in its entirety.

FIELD OF THE INVENTION

The present invention relates generally to the field of simulated animals. More specifically, the present invention relates to a window-attachment animal head device primarily comprised of a body that resembles the head of an animal that is further comprised of at least one suction cup and at least one L-bracket that allows the device to removably-attach to a vehicle window. In this manner, the device allows a user to bring joy, humor and happiness to passing motorists that would ordinarily occur by bringing their pet in a vehicle, but without having to bring said pet into the vehicle. Accordingly, the present disclosure makes specific reference thereto. Nonetheless, it is to be appreciated that aspects of the present invention are also equally applicable to other like applications, devices and methods of manufacture.

BACKGROUND

Many individuals have pets that accompany them in the car while driving. Pet owners, especially dog owners, often roll down a window of the vehicle, such that the pet can stick its head out of the window while the vehicle is in motion to experience the sights, smells and sounds the vehicle passes. This behavior is not only satisfying for the animal, but is also enjoyable for other motorists on roadways who may see the animal and react pleasantly in the event that they are also an animal lover. In this manner, pets who stick their heads out of car windows often bring joy and humor to other motorists. However, it is obviously impractical for a pet owner to bring an animal everywhere he or she travels. To this effect, other motorists are denied the joy of viewing pets with their heads out a vehicle window, while traveling along a roadway. This may be also undesirable for the pet owner, as said owner also enjoys bringing happiness and humor into the lives of other motorists while driving, but cannot do this continuously.

Therefore, there exists a long-felt need in the art for a device that allows a user to bring joy and humor to other motorists. There also exists a long-felt need in the art for a device that allows a user to bring joy and humor to other motorists by displaying a pet with the pet's head hanging out of the window of his or her vehicle. Finally, there exists a long-felt need in the art for a window-attachable animal head device that allows a user to bring joy and humor to other motorists by displaying a pet with the pet's head hanging out the window of his or her vehicle, but without the need to physically have the pet in the vehicle to achieve this desired outcome.

The subject matter disclosed and claimed herein, in one embodiment thereof, comprises a window-attachment animal head device. The device is primarily comprised of a body that resembles the head of an animal and that is further comprised of at least one suction cup and at least one L-bracket that allows the device to removably-attach to a vehicle window. The body also comprises a set of ears, a set of eyes, a nose/snout and a mouth with a tongue. In the preferred embodiment, the tongue hangs out of the mouth and may be of an exaggerated length, and the ears may also be of an exaggerated length, wherein both are preferably non-rigid, such that they can be blown freely by the wind while the device is attached to a vehicle window and the vehicle is in motion.

In this manner, the window-attachment animal head device of the present invention accomplishes all of the forgoing objectives and allows a user to bring joy and humor to other motorists by simulating a pet with the pet's head hanging out of the window of the vehicle. However, the device does not require that a user physically have their pet with them in the vehicle to achieve this desired outcome. In this manner, the window-attachment animal head device overcomes the inconvenience of a user bringing his or her pet in a vehicle in order to bring joy, humor and happiness to passing motorists and provides an option that does not require a living pet.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a window-attachment animal head device primarily comprised of a body that resembles the head of an animal, and that is further comprised of at least one suction cup and at least one L-bracket that allows the device to attach to a vehicle window. The body also comprises a set of ears, a set of eyes, a nose/snout and a mouth with a tongue. In the preferred embodiment, the tongue hangs out of the mouth and may be of an exaggerated length. The ears may also be of an exaggerated length. Both the ears and tongue are preferably non-rigid, such that they can be blown freely by the wind while the device is attached to a vehicle window and the vehicle is in motion. All other portions of the body are preferably rigid, including the eyes, nose, and mouth. Further, the eyes may be "googly eyes" or "wiggle eyes" known in the art, that are comprised of a white plastic or card backing covered by a clear, hard-plastic shell that encapsulates a black plastic disk that moves within the shell. In differing embodiments, the body may resemble the head of any animal known in the art, but preferably resembles the head of any dog or cat breed known in the art.

In order to attach the device to a window of a vehicle in a removable fashion, the bottom surface of the body is further comprised of at least one suction cup and at least one L-bracket. The at least one suction cup may contain a peelable adhesive layer to further secure the cup to a window. Similarly, the L-bracket may also be comprised of at least one suction cup that may contain a peelable adhesive layer to further secure the cup to a window. Accordingly, the at least one suction cup engages the front surface of a window and creates a suction force. Further, the L-bracket contacts the top edge and the rear surface of a window. In this manner, the L-bracket retains the device on the window due to the weight of the body pressing the bracket against the rear surface of the window. The suction cup also directly opposes the force of the L-bracket and further secures the body to the window. As a result, the device is positioned, such that it gives the appearance of a pet looking out the window to other motorists who pass by the vehicle. In this manner, the user can keep the device attached to the window at all times to bring enjoyment, happiness and humor to passerby motorists.

Accordingly, the window-attachment animal head device of the present invention is particularly advantageous as it allows a user to bring joy and humor to other motorists by simulating a pet with the pet's head hanging out the window of the vehicle. However, the device does not require that a user physically have the real pet with him or her in the vehicle to achieve this desired outcome. In this manner, the window-attachment animal head device overcomes the inconvenience of a user bringing the pet in a vehicle in order to bring joy, humor and happiness to passing motorists, and provides an option that does not require a living pet at all.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
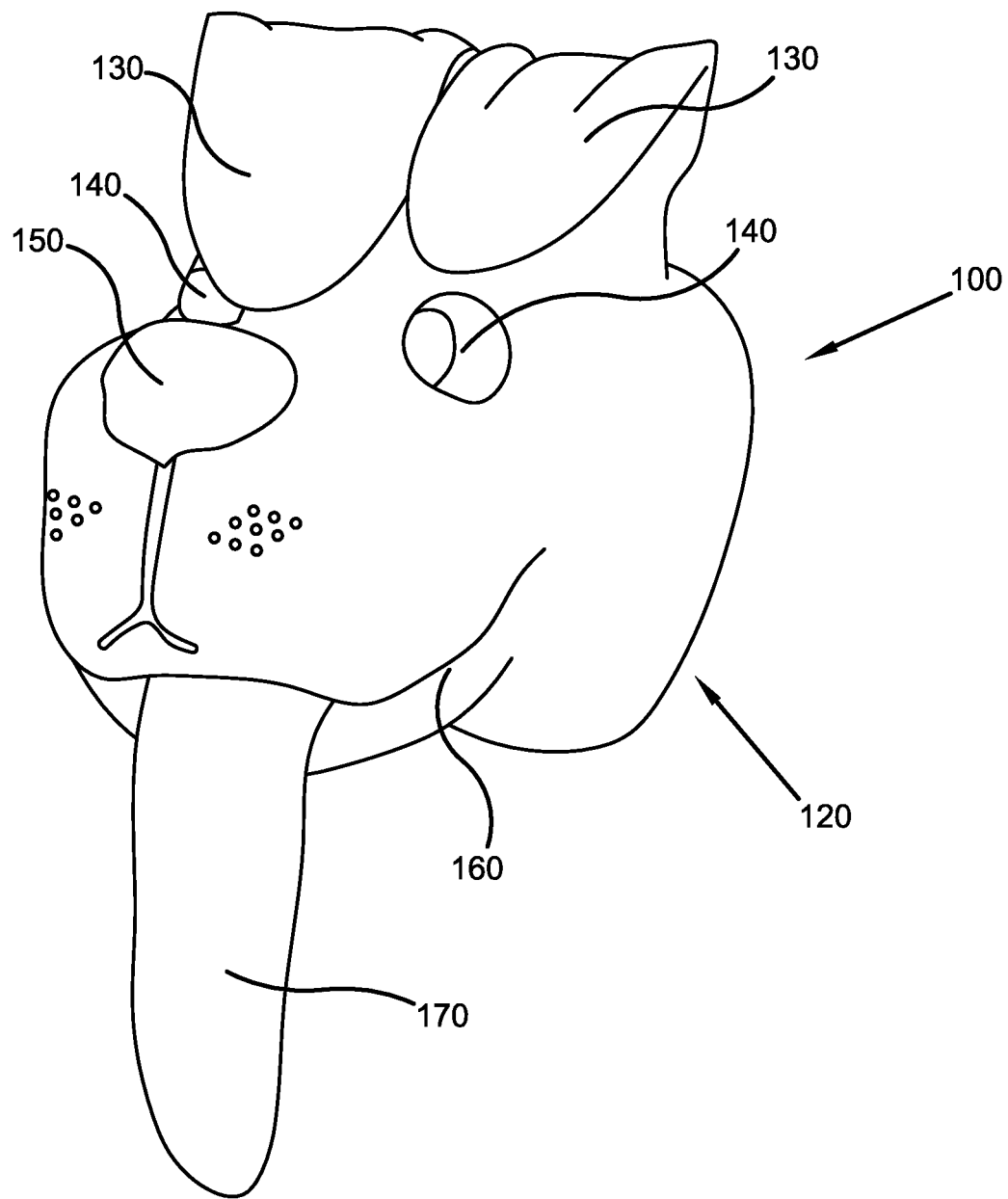
FIG. 1 illustrates a perspective view of one potential embodiment of the window-attachment animal head device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that allows a user to bring joy and humor to other motorists by displaying a pet with the pet's head hanging out the window of their vehicle. Further, there exists a long-felt need in the art for a window-attachable animal head device that allows a user to bring joy and humor to other motorists by displaying a pet with the pet's head hanging out the window of the vehicle, but without the need to physically have the pet in the vehicle to achieve this desired outcome.

The present invention, in one exemplary embodiment, is comprised of a window-attachment animal head device primarily comprised of a body that resembles the head of an animal and further comprising at least one suction cup and at least one L-bracket that allows the device to attach to a vehicle window. The body is also comprised of a set of ears, a set of eyes, a nose/snout and a mouth with a tongue. In the preferred embodiment, the tongue hangs out of the mouth and may be of an exaggerated length and the ears may also be of an exaggerated length. Both the ears and tongue are preferably non-rigid, such that they can be blown freely by the wind while the device is attached to a vehicle window and the vehicle is in motion. All other portions of the body are preferably rigid, including the eyes, nose, and mouth. Further, the eyes may be "googly eyes" or "wiggle eyes" known in the art, that are comprised of a white plastic or card backing covered by a clear, hard-plastic shell that encapsulates a black plastic disk that moves within the shell. The body may resemble the head of any animal known in the art, but preferably resembles the head of any dog or cat breed known in the art.

In order to attach the device to a window of a vehicle in a removable fashion, the bottom surface of the body is further comprised of at least one suction cup and at least one L-bracket. The at least one suction cup and the L-bracket may contain a peelable adhesive layer to further secure the cup to a window. Accordingly, the at least one suction cup engages the front surface of a window and creates a suction force and the L-bracket contacts the top edge and the rear surface of a window. In this manner, the L-bracket retains the device on the window due to the weight of the body pressing the bracket against the rear surface of the window. The suction cup also directly opposes the force of the L-bracket and further secures the body to the window. As a result, the device is positioned such that it gives the appearance of a pet looking out the window to other motorists who pass by the vehicle to which the device is attached. In this manner, the user can keep the device attached to the window at all times to bring enjoyment, happiness and humor to passerby motorists.

Accordingly, the window-attachment animal head device of the present invention is particularly advantageous as it allows a user to bring joy and humor to other motorists by simulating a pet with the pet's head hanging out the window of the vehicle. However, the device does not require that a user physically have the real pet in the vehicle to achieve this desired outcome. In this manner, the window-attachment animal head device overcomes the inconvenience of a user bringing the pet with them in a vehicle in order to bring joy, humor and happiness to passing motorists, and provides an option that does not require a living pet at all.

Referring initially to the drawings, FIG. 1 illustrates a perspective view of one embodiment of the window-attachment animal head device 100 of the present invention. The device 100 is primarily comprised of a body 120 that resembles the head of an animal, and further comprises at least one suction cup 124 and at least one L-bracket 126 that allows the device 100 to attach to a vehicle window 10. The device 100 is preferably comprised of a body 120 comprising a set of ears 130, a set of eyes 140, a nose/snout 150 and a mouth 160 with a tongue 170 that hangs out of the mouth 160. In a preferred embodiment, the tongue 170 may be of an exaggerated length. The ears 130 may also be of an exaggerated length. Both the ears 130 and the tongue 170 are preferably non-rigid, such that they can be blown freely by the wind while the device 100 is attached to a vehicle window 10 and the vehicle is in motion. All other portions of the body 120 are preferably rigid.

The ears 130 and tongue 170 are preferably comprised of a fabric material such as, but not limited to, vinyl, canvas, cashmere, chenille, chiffon, cotton, damask, jersey, lace, linen, wool, modal, polyester, satin, silk, spandex, suede, tweed, twill, velvet, acrylic, modacrylic, nylon, polypropylene, polyurethane, polyvinyl chloride, polyethylene, vinylidene, benzoate, aramid, rayon, acetate, triacetate, etc., or any other suitable material as is known in the art. The rest of the body 120, including the eyes 140, nose 150 and mouth 160 are typically comprised of a rigid plastic material such as, but not limited to, an acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, etc., or any other suitable material as is known in the art. In differing embodiments, the body 120 may resemble the head of any animal known in the art, but preferably resembles the head of any dog or cat breed known in the art. Further, the eyes 140 may be "googly eyes" or "wiggle eyes" as is known in the art, that are comprised of a white plastic or card backing covered by a clear, hard-plastic shell that encapsulates a black plastic disk that moves within the shell. In addition, the body 120 and all components are preferably waterproof.

Figure 2:
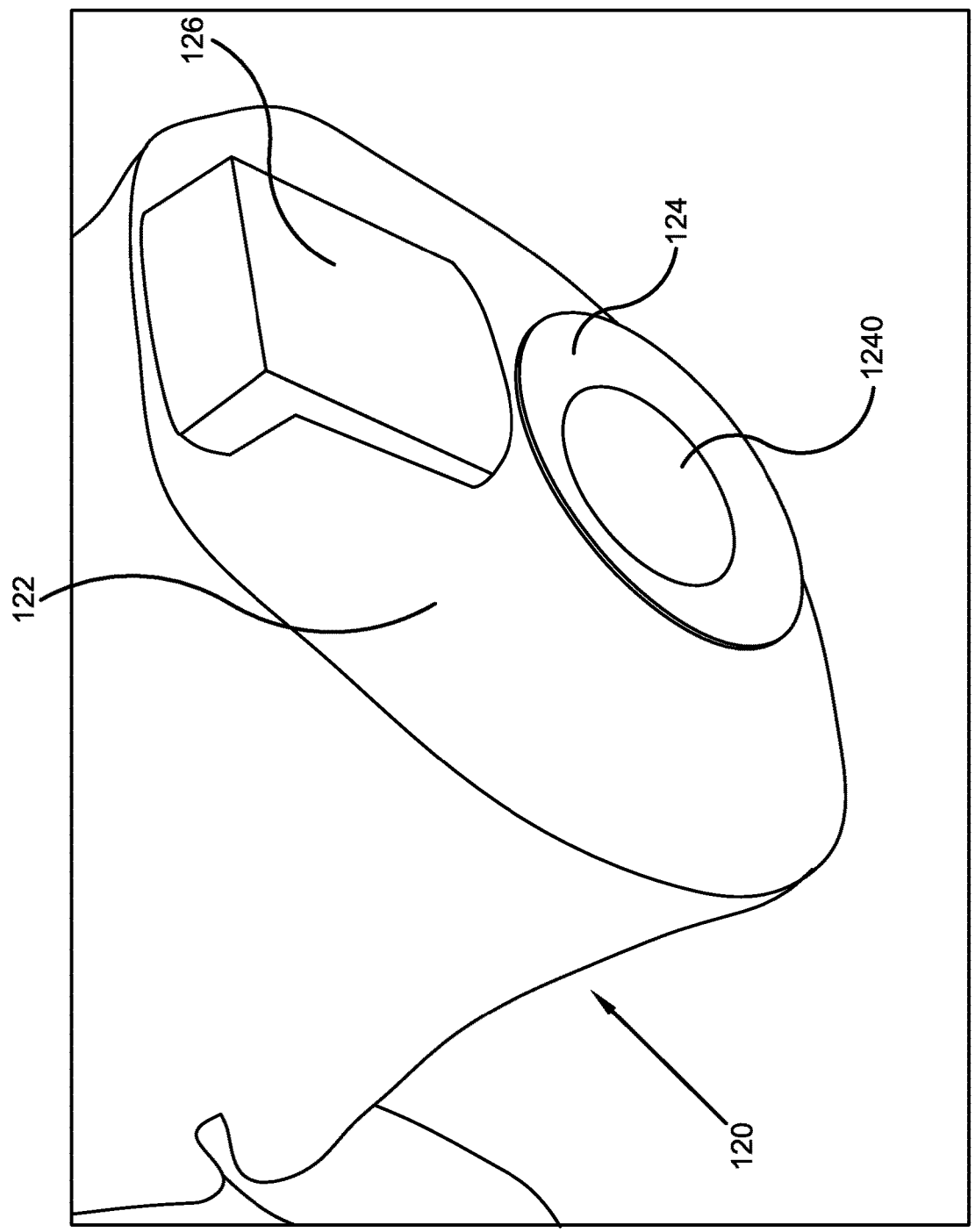
FIG. 2 illustrates a rear view of one potential embodiment of the window-attachment animal head device of the present invention in accordance with the disclosed architecture.

FIG. 2 illustrates a rear view of one embodiment of the window-attachment animal head device 100 of the present invention. In order to allow the device 100 to removably-attach to a window 10 of a vehicle, the bottom surface 122 of the body 120 is further comprised of at least one suction cup 124 and at least one L-bracket 126. In differing embodiments, the at least one suction cup 124 may contain a peelable adhesive layer 1240 to further secure the suction cup 124 to a window 10. Further, the L-bracket 126 may also be comprised of at least one suction cup 124 that may contain a peelable adhesive layer 1240 to further secure the suction cup 124 to a window 10.

Figure 3:
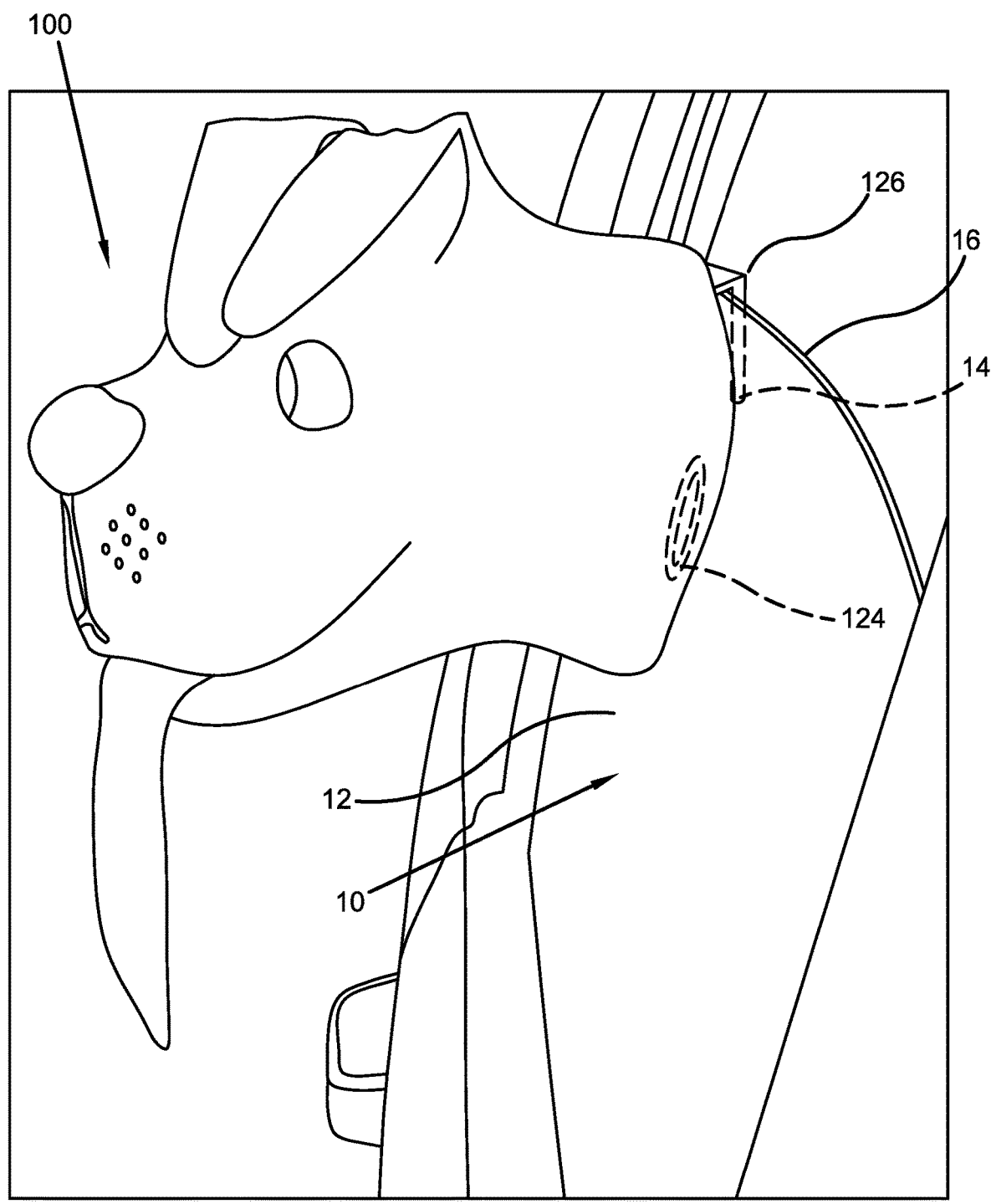
FIG. 3 illustrates a side perspective view of one potential embodiment of the window-attachment animal head device of the present invention while attached to a vehicle window (shown as prior art) in accordance with the disclosed architecture.

FIG. 3 illustrates a side perspective view of one embodiment of the window-attachment animal head device 100 of the present invention while attached to a vehicle window 10 (shown as prior art). As stated supra, the device 100 can be removably-secured to a vehicle window 10, such that it can be displayed towards other motorists in a position mimicking the position a pet would have if looking out of the window 10. To accomplish this, the suction cup 124 engages the front surface 12 of a window 10 and creates a suction force. Further, the L-bracket 126 contacts the top edge 16 and the rear surface 14 of a window 10. In this manner, the L-bracket 126 retains the device 100 on the window 10 due to the weight of the body 120 pressing the bracket 126 against the rear surface 14 of the window 10. Further, the suction cup 124 directly opposes the force of the L-bracket 126 and further secures the body 120 to the window 10.

Figure 4:
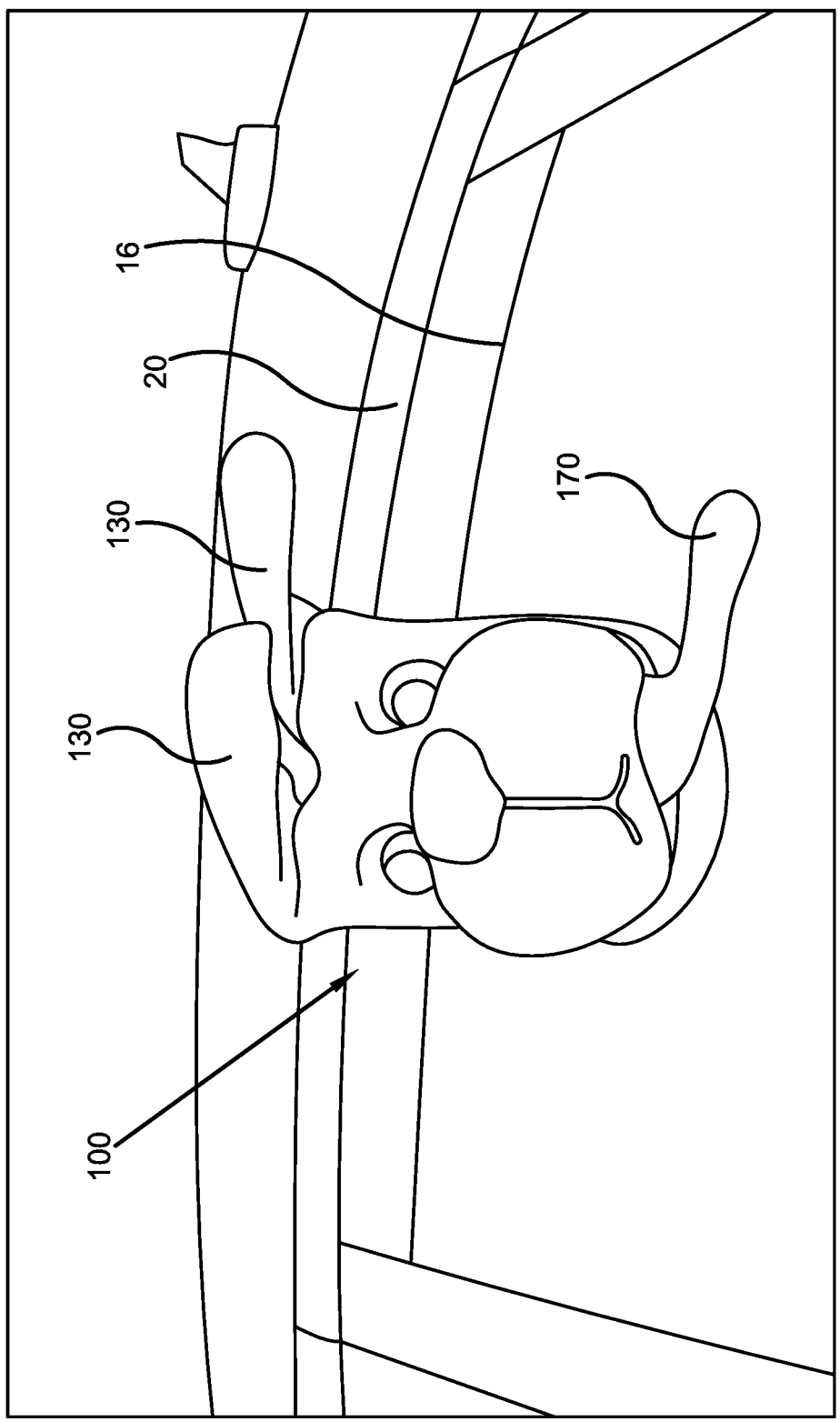
FIG. 4 illustrates a front perspective view of one potential embodiment of the window-attachment animal head device of the present invention while attached to a vehicle window (shown as prior art) in accordance with the disclosed architecture.

FIG. 4 illustrates a front perspective view of one embodiment of the window-attachment animal head device 100 of the present invention while attached to a vehicle window 10 (shown as prior art). While attached to a window, the device 100 gives the appearance of a pet looking out the window 10 to other motorists who pass by the vehicle. In this manner, the user can allow the device 100 to remained attached to a window 10 at all times to bring enjoyment, happiness and humor to passerby motorists. In addition, the user can roll the window 10 upwards, such that the L-bracket 126 only creates a small gap between the window 10 and the window frame 20. In this manner, the distance that the window 10 has to be kept down while driving is minimized to increase user comfort and prevent wind/precipitation from entering the vehicle. It is also contemplated that the head of the device 100 could swivel 45 degrees in either direction, and or emit sounds (e.g., a dog barking).

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "window-attachment animal head device" and "device" are interchangeable and refer to the window-attachment animal head device 100 of the present invention.

Notwithstanding the forgoing, the window-attachment animal head device 100 of the present invention and its various components can be of any suitable size and configuration as is known in the art without affecting the overall concept of the invention, provided that they accomplish the above-stated objectives. One of ordinary skill in the art will appreciate that the size, configuration and material of the window-attachment animal head device 100 as shown in FIGS. 1-4 is for illustrative purposes only, and that many other sizes and shapes of the window-attachment animal head device 100 are well within the scope of the present disclosure. Although the dimensions of the window-attachment animal head device 100 are important design parameters for user convenience, the window-attachment animal head device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A window-attachment animal head device that allows a user to bring joy and humor to another motorist, the window-attachment animal head comprising:
 a body that resembles a head of an animal, wherein the body comprises a pair of ears, a pair of eyes, a snout and a mouth with a tongue that hangs out of the mouth;
 at least one suction cup; and
 at least one L-bracket positioned to directly oppose the at least one suction cup; and
 wherein the head is configured to swivel.

2. The window-attachment animal head device of claim 1, wherein the window-attachment animal head device is removably secured to a vehicle window via the at least one suction cup and the at least one L-bracket.

3. The window-attachment animal head device of claim 1, wherein the tongue and the pair of ears are of an exaggeration length.

4. The window-attachment animal head device of claim 3, wherein the tongue and the pair of ears are non-rigid so that they blow freely via wind while the window-attachment animal head device is attached to a vehicle window of a vehicle in motion.

5. A window-attachment animal head device that allows a user to bring joy and humor to another motorist, the window-attachment animal head device comprising:
 a body that resembles a head of a dog and is comprised of a pair of exaggerated, non-rigid ears, a pair of eyes, a snout and a mouth having an exaggerated, non-rigid tongue that extends outwardly from the mouth;
 at least one suction cup; and
 at least one L-bracket; and
 wherein the window-attachment animal head device can be removably secured to a vehicle window via the at least one suction cup contacting a front surface of the vehicle window and the at least one L-bracket contacting a rear surface of the vehicle window directly opposite the at least one suction cup; and
 wherein the head is configured to swivel up to 45 degrees.

6. The window-attachment animal head device of claim 5, wherein the tongue and the pair of ears are non-rigid, such that they can blow freely via wind while the window-attachment animal head device is attached to a vehicle window of a vehicle in motion.

7. The window-attachment animal head device of claim 5, wherein the body, excluding the pair of exaggerated, non-rigid ears and the exaggerated, non-rigid tongue, is comprised of a rigid plastic or a rubber.

8. A window-attachment animal head device that simulates the appearance of an animal head hanging out a vehicle window, the window-attachment animal head device comprising:
 a body that resembles the animal head and is comprised of a pair of ears, a pair of eyes, a snout and a mouth having a tongue that extends outwardly from the mouth;
 at least one suction cup comprising a peelable adhesive layer; and
 at least one L-bracket comprising a bracket suction cup comprising a second peelable adhesive layer; and
 wherein the head is configured to swivel up to 45 degrees left or right; and
 wherein the head is further configured to emit a sound.

9. The window-attachment animal head device of claim 8, wherein the tongue and the pair of ears are non-rigid, such that they can blow freely via wind while the window-attachment animal head device is attached to a vehicle window of a vehicle in motion.

10. The window-attachment animal head device of claim 8, wherein the window-attachment animal head device can be removably secured to a vehicle window via the at least one suction cup contacting a front surface of the vehicle window and the at least one L-bracket contacting the rear surface of the vehicle window.

11. The window-attachment animal head device of claim 10, wherein the at least one suction cup engages the front surface of the vehicle window and creates a suction force.

12. The window-attachment animal head device of claim 11, wherein the L-bracket contacts a top edge and the rear surface of the vehicle window.

13. The window-attachment animal head device of claim 8, wherein the pair of eyes are comprised of a white plastic or a card backing covered by a clear, hard-plastic shell that encapsulates a black plastic disk that moves within the clear, hard-plastic shell.

14. The window-attachment animal head device of claim 8, wherein the body resembles a head of a cat or a dog.

15. The window-attachment animal head device of claim 8, wherein the body, excluding the pair of ears and the tongue, are comprised of a rigid plastic or a rubber.

16. The window-attachment animal head device of claim 8, wherein the body is waterproof.

* * * * *